(12) United States Patent
Jago

(10) Patent No.: US 6,390,981 B1
(45) Date of Patent: May 21, 2002

(54) ULTRASONIC SPATIAL COMPOUNDING WITH CURVED ARRAY SCANHEADS

(75) Inventor: James R. Jago, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/577,021

(22) Filed: May 23, 2000

(51) Int. Cl.[7] ................................................. A61B 8/14
(52) U.S. Cl. ...................................... 600/443; 600/459
(58) Field of Search ................................ 600/437, 441, 600/443, 447, 454–456, 459; 73/625, 626, 641; 367/104; 524/413, 430

(56) References Cited

U.S. PATENT DOCUMENTS

| | | | |
|---|---|---|---|
| 4,070,905 A | * 1/1978 | Kossoff | 73/614 |
| 4,159,462 A | 6/1979 | Rocha et al. | |
| 4,319,489 A | * 3/1982 | Yamaguchi et al. | 73/626 |
| 4,649,927 A | 3/1987 | Fehr et al. | |
| 4,751,846 A | 6/1988 | Dousse | |
| 5,105,813 A | * 4/1992 | Shikata | 600/441 |
| 5,148,810 A | * 9/1992 | Maslak et al. | 600/437 |
| 5,335,663 A | * 8/1994 | Oakley et al. | 600/459 |
| 5,538,004 A | 7/1996 | Bamber | |
| 5,566,674 A | 10/1996 | Weng | |
| 5,575,286 A | 11/1996 | Weng et al. | |
| 5,653,235 A | * 8/1997 | Teo | 600/447 |
| 5,655,535 A | 8/1997 | Friemel et al. | |
| 5,782,766 A | 7/1998 | Weng et al. | |
| 5,893,363 A | * 4/1999 | Little et al. | 600/447 |
| 5,908,390 A | 6/1999 | Matsushima | |
| 6,126,598 A | * 10/2000 | Entrekin et al. | 600/437 |

FOREIGN PATENT DOCUMENTS

WO  WO 00/20884  4/2000

OTHER PUBLICATIONS

Feigenbaum, Echocardiography, Lea & Febiger, 1976 at pp 32–34, Philadelphia, PA.
Carpenter et al., Technical Note—A Multimode Real Time Scanner, Ultrasound in Med. & Biol., vol. 6, pp 279–284, Pergamon Press Ltd., 1980, Great Britain.
Berson et al., Compound Scanning With an Electrically Steered Beam, Ultrasonic Imaging 3, pp 303–308, Academic Press, Inc., 1981.
Shattuck et al., Compound Scanning With A Phased Array, Ultrasonic Imaging 4, pp. 93–107, Academic Press, Inc., 1982.
Jesperson et al., Multi–Angle Compound Imaging, Ultrasonic Imaging 20, pp 81–102, Dynamedia, Inc., 1998.

* cited by examiner

Primary Examiner—Marvin M. Lateef
Assistant Examiner—Ali M. Imam
(74) Attorney, Agent, or Firm—W. Brinton Yorks, Jr.

(57) ABSTRACT

An ultrasonic diagnostic imaging system is used to produce spatially compounded ultrasonic images with beams transmitted in multiple look directions from a curved array scanhead. The beam steering is a function of both the curvature of the curved array and electronic beam steering. The beams may be steered in groups of parallel beams, or in groups which have a common angular orientation to their points of origin along the array. The describe embodiments provide advantages in beamforming and registration coefficient usage, sampling uniformity, speckle reduction uniformity, and a larger area of maximum compounding effect.

25 Claims, 7 Drawing Sheets

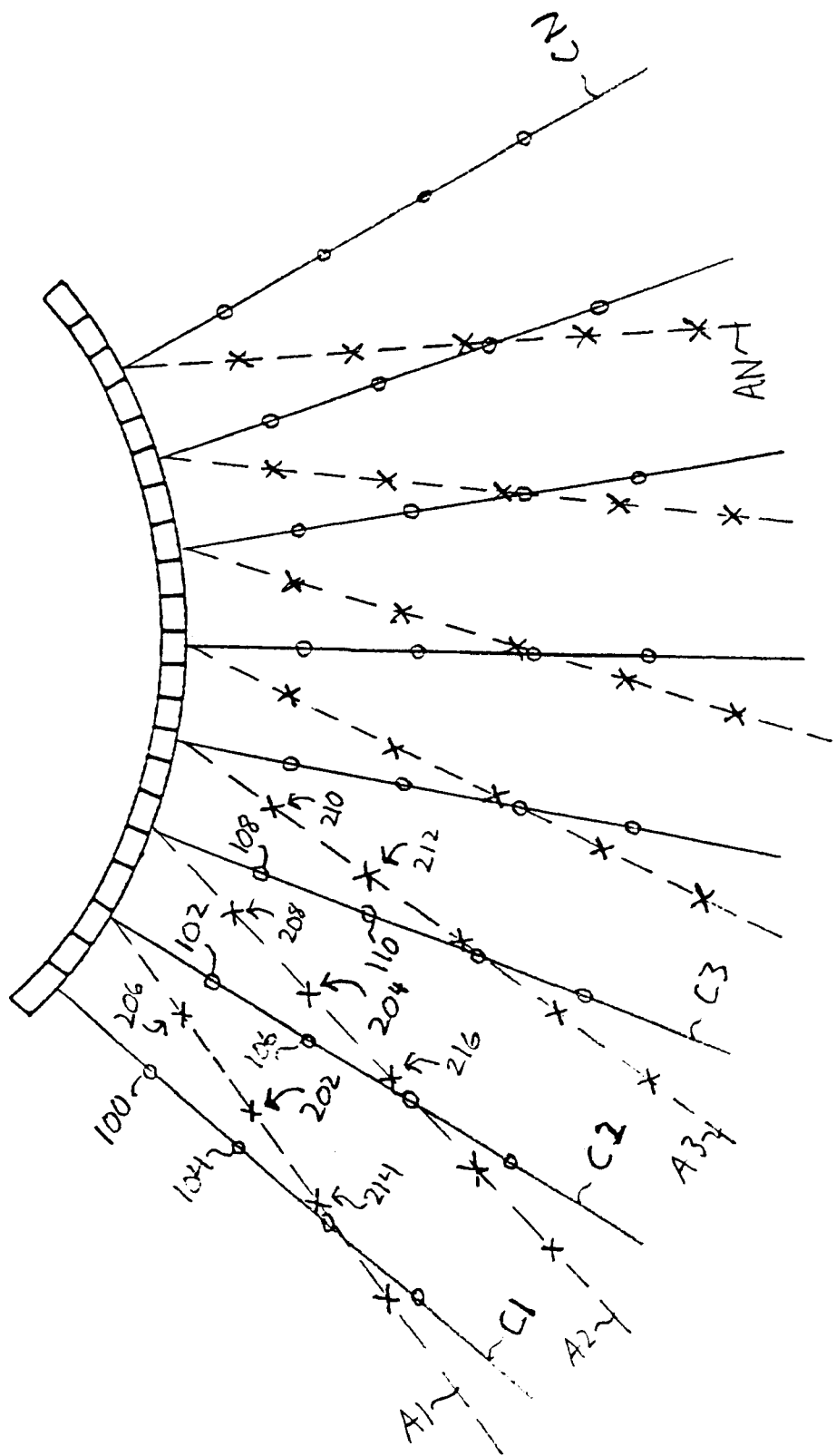

ULTRASONIC SPATIAL COMPOUNDING WITH CURVED ARRAY SCANHEADS

This invention relates to ultrasonic diagnostic imaging systems and, in particular, to ultrasonic diagnostic imaging systems which produce spatially compounded images of Doppler signal information.

My U.S. Pat. No. 6,210,328 describes apparatus and methods for performing real time spatial compounding of ultrasonic diagnostic images. Spatial compounding is an imaging technique in which a number of ultrasound images of a given target that have been obtained from multiple vantage points or angles are combined into a single compounded image by combining the data (e.g., by linearly or nonlinearly averaging or filtering) at each point in the compound image which has been received from each angle. The compounded image typically shows lower speckle and better specular reflector delineation than conventional ultrasound images from a single viewpoint.

In a constructed implementation an ultrasonic transducer scans a target from a number of different perspectives. For example, several sector images can be sequentially acquired by a phased array transducer, each with an apex located at a different point along the array. As a second example a steered linear array can be used to image the target with a sequence of groups of beams, each group steered at a different angle with respect to the axis of the array. In either case the received images are processed in the usual way by beamforming and detection and stored in a memory. To form the compound image the images are spatially aligned (if not already aligned by a common beam steering reference, for instance) by spatially correlating the image data. The common spatial locations in the images are then compounded by averaging or summing and the resultant compound image is displayed.

The improvements in image quality afforded by spatial compounding are a function of the number of echoes from different look directions which are compounded at the various points in the image field. As my aforementioned patent application describes, a scanhead array of finite size will produce an image region in which maximal spatial compounding occurs, referred to therein as the region of maximum image quality (RMIQ). The RMIQ is in turn a function of the number of look directions and the angular range traversed by the different look directions. It is desirable to have a RMIQ which is as large as possible with the RMIQ covering a substantial portion of the image field.

In accordance with the principles of the present invention, spatial compounding is performed by use of a curved array scanhead. In one embodiment the beams of the different look directions are steered in parallel groups, affording an ease in image scan conversion. In another embodiment the beams of the different look directions are radially steered by taking advantage of the array curvature, affording an ease in beamforming and image scan conversion, improved sampling uniformity, an improvement in the RMIQ size, and improved signal to noise ratio.

Figure 3:
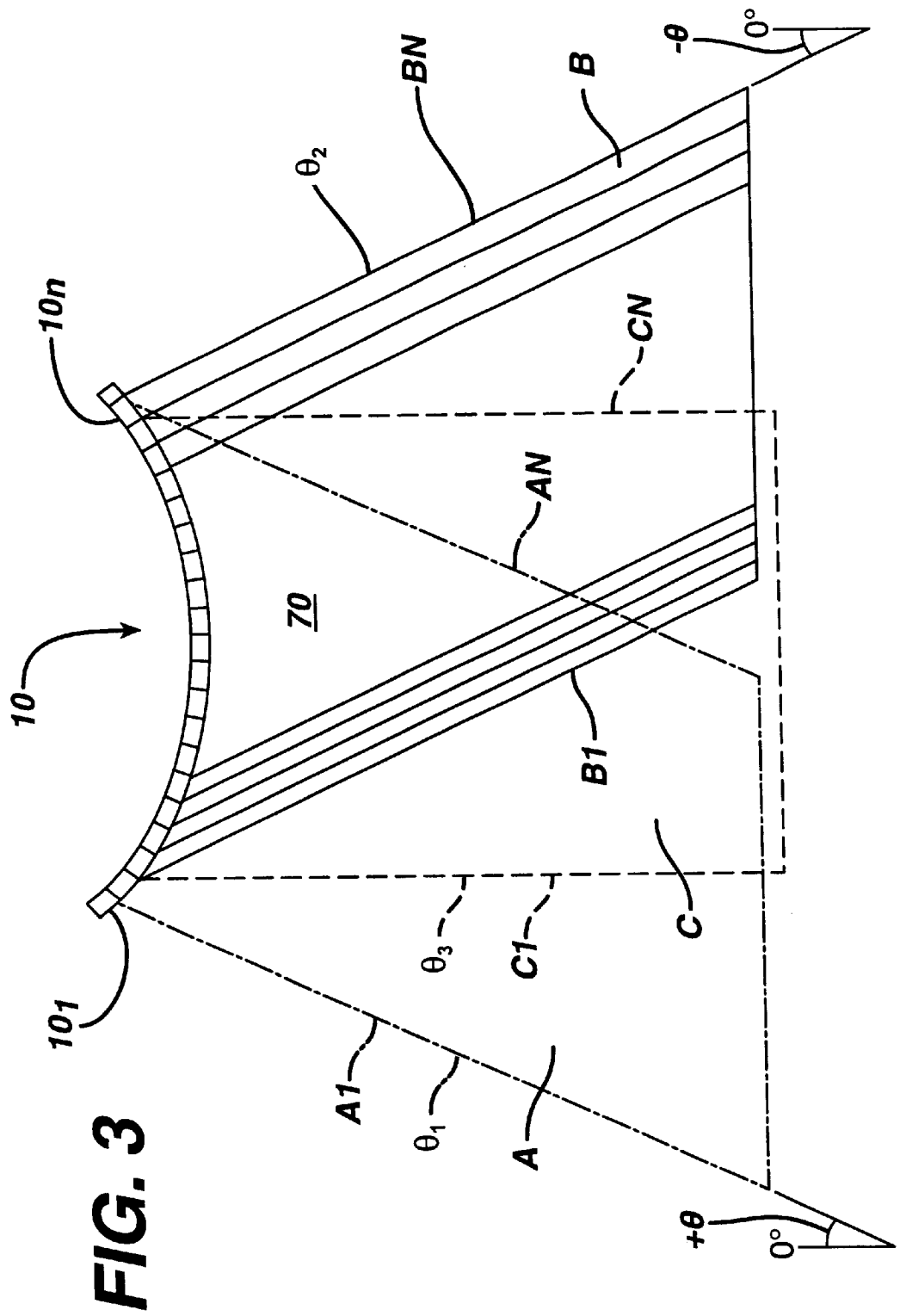
FIG. 3 illustrates a first compound scanning format for a curved array transducer in accordance with the principles of the present invention.
Figure 4:
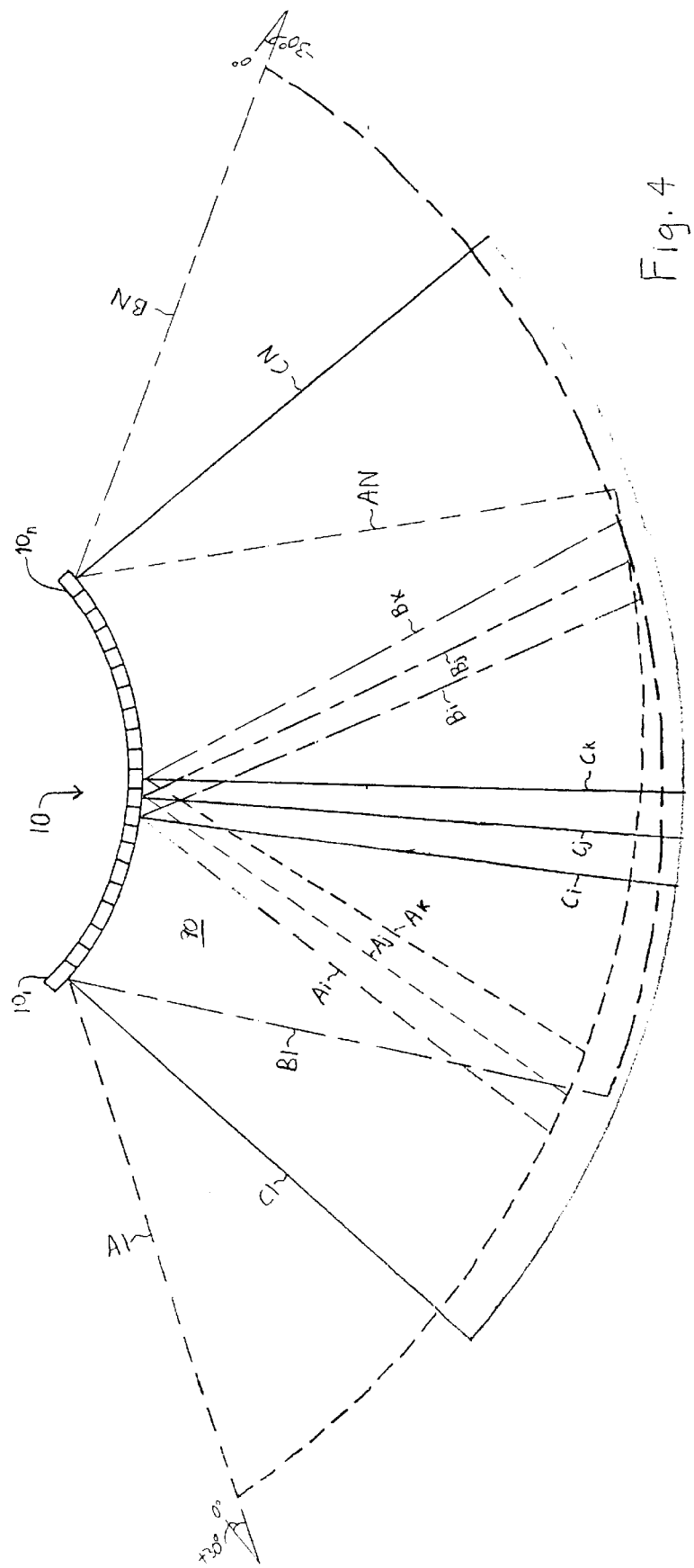
FIG. 4 illustrates a second compound scanning format for a curved array transducer in accordance with the principles of the present invention.
Figure 5B:
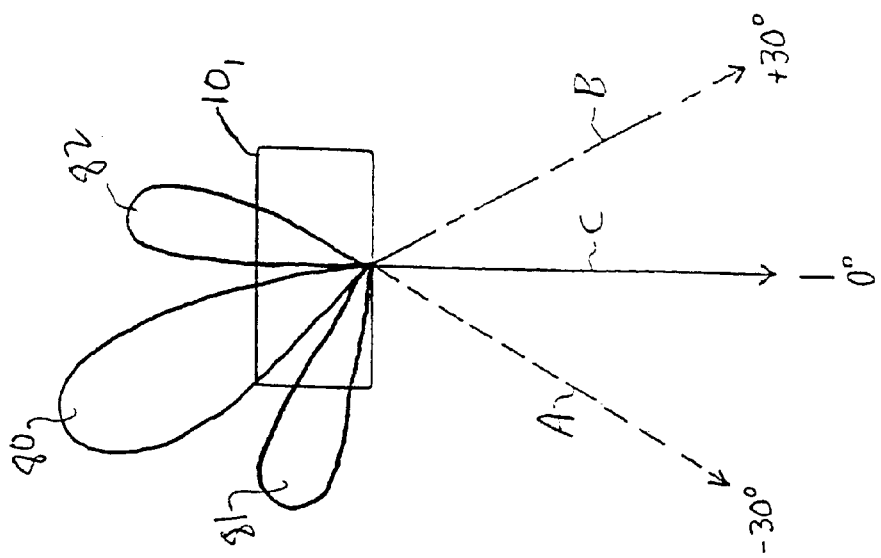
Figure 5A:
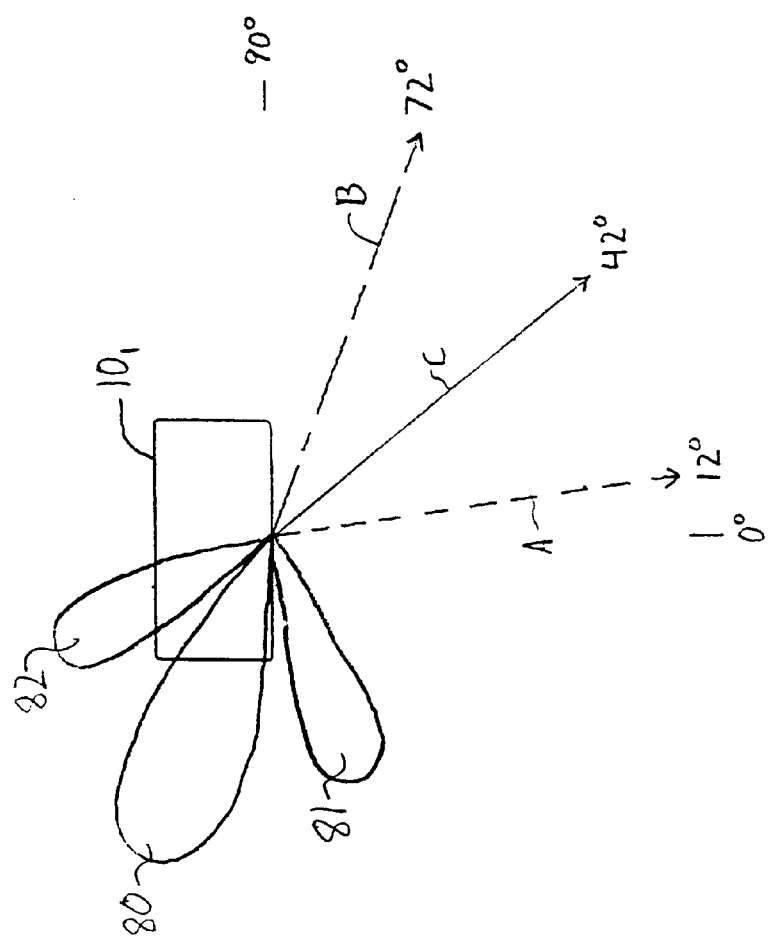
Figure 6:
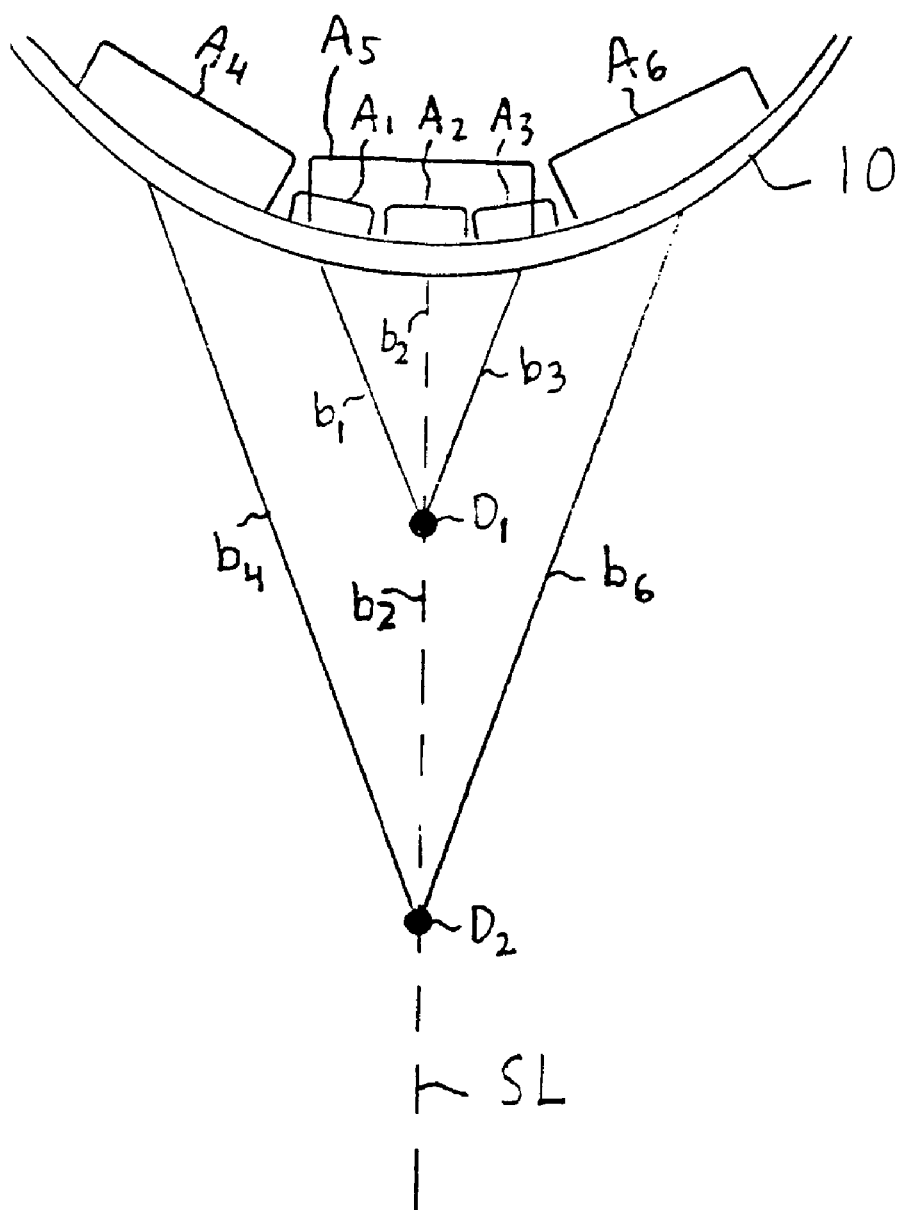

FIGS. 5a and 5b compare the beam angles used in the illustrated compound scanning formats of FIGS. 3 and 4;

FIG. 6 illustrates the separation of apertures with image field depth; and

FIG. 7 illustrates the registration processing efficiency realized by use of the compound scanning format of FIG. 4.

Figure 1:
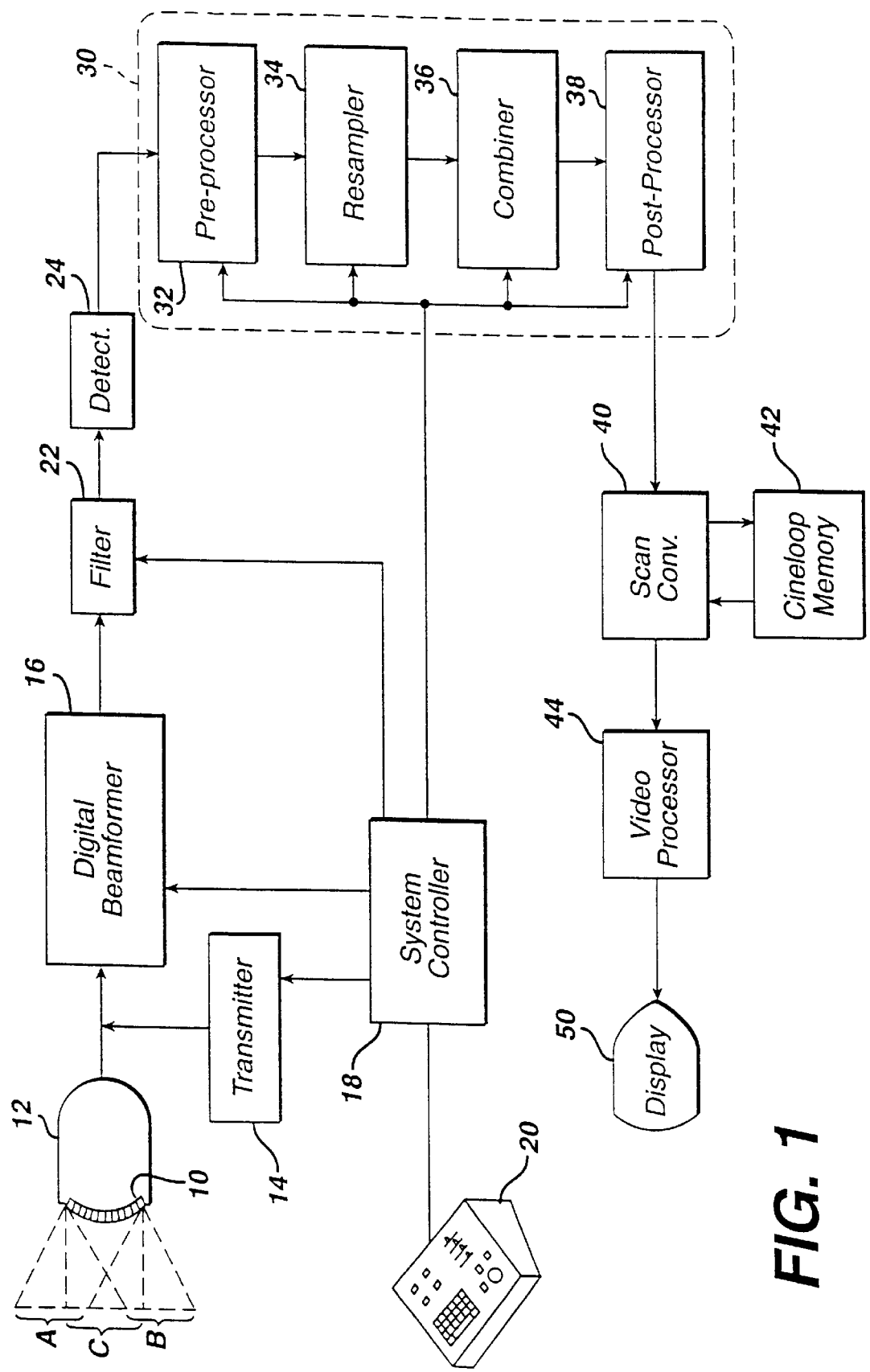
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is shown.

A scanhead 12 including a curved array transducer 10 transmits beams at different angles over an image field denoted by the dashed rectangle and parallelograms. Three groups of scanlines are indicated in the drawing, labeled A, B, and C with each group being steered at a different angle relative to the image field. Within each group, each beam exhibits a different angles of incidence to a line tangential to the point of origin on the array face from which the beam center extends. These angles progressively increase or decrease (depending upon one's point of reference) from one edge of the group to the other. The transmission of the beams is controlled by a transmitter 14 which controls the phasing and time of actuation of each of the elements of the array transducer so as to transmit each beam from a predetermined origin along the array and at a predetermined angle. The echoes returned from along each scanline are received by the active elements of the array aperture for that beam, digitized as by analog to digital conversion, and coupled to a digital beamformer 16. Generally the active aperture of each beam will dynamically expand as echoes are received from increasing depths and/or transmitted to increasing depths by zone focusing. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls on a user interface 20 operated by the user of the ultrasound system. The system controller controls the transmitter to transmit the desired number of scanline groups at the desired angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame to be in registration with those of another component frame or to the pixels of the display space.

After resampling the image frames are compounded by a combiner 36. Combining may comprise summation, averaging, peak detection, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924, or displays of an extended field of view by overlaying successively acquired, partially overlapping images in the lateral dimension. Following scan conversion the spatially compounded images are processed for display by a video processor 44 and displayed on an image display 50.

Figure 2:
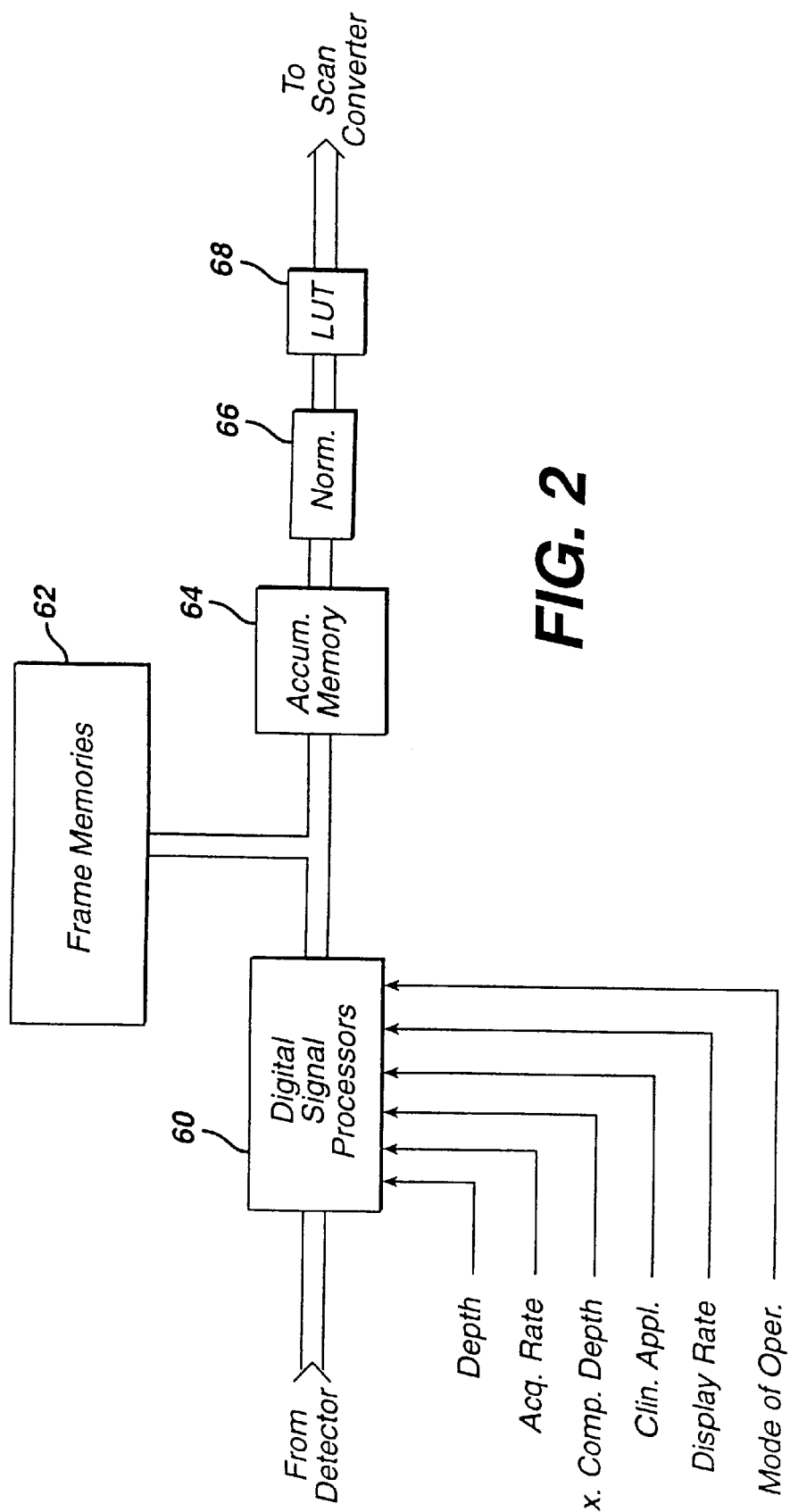
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. As described in the previously referenced U.S. patent application, the digital signal processors are responsive to changes in system control parameters including image display depth, number of scanlines or line density, number of transmit focal zones, amount of deadtime per pulse repetition interval (PRI), number of transmissions per image line, depth of region of greatest compounding, clinical application, number of simultaneous modes, size of region of interest, mode of operation, and acquisition rate for determining the number of component frames to compound at a given point in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

The digital signal processors 60 determine the number of frames which are to be compounded to improve image quality while still providing an acceptable realtime compound image frame rate. Increasing the number of component frames does not lead to a proportional or unlimited increase in the image quality of the compound image. There is, therefore, a practical maximum number of frames, each steered by a minimum angle, that can be usefully employed to improve image quality in spatial compound scanning. This number can vary widely depending on the transducer design and size of the active aperture, but can be as large as 16 component frames per compound image for an array with a large acceptance angle and small active apertures. The maximum useful number of frames will also depend on the mixture of speckle and anisotropic scatterers in the tissue of interest, and therefore on the clinical application.

FIG. 3 illustrates a first compound scanning format for a curved array transducer in accordance with the principles of the present invention. The curved array transducer is shown as a 1D array for ease of illustration, but may also be a 1.5D array, a 1.75D array, or a 2D array. The curved array transducer 10 consists of n element extending in an arc from element $10_1$ on the left to element $10_n$ on the right. The arc may be tightly curved or gently curved, depending upon the desired application. In this embodiment the curved array transmits and receives groups of beams in three look directions. The group of beams consisting of beams A1 through AN are directed at an angle of +θ with respect to a line drawn normal to the center of the face of the array. The group of beams consisting of beams B1 through BN are directed at an angle of −θ with respect to the same line, and the group of beams consisting of beams C1 through CN are directed at an angle of 0° with respect to the same line. The number of beams N of each group may be the same or different from group to group, and may be greater, equal to, or less than the number of array elements n. The beams of each group are parallel and of increasing separation proceeding from the innermost beam of each group (B1 of group B, AN of group A, and C(N/2) of group C) by reason of the progressively changing angle of incidence of each beam with its origin on the face of the array. The time delay and weighting coefficients used in transmit and receive beamforming will thus progressively change from line to line across each group. This embodiment affords an ease in beamforming because the symmetry of the scanning format allows coefficients and weights to be reused for multiple lines. Beams AN and B1 can use the same beamforming weights and coefficients but in reverse order as their apertures are the mirror image of each other. Likewise, beams C1 and Cn are mirrored and can use the same coefficients and weights. In a constructed embodiment the mirroring relationship may mean that the same magnitude values may be used for the different scanlines but with a sign difference. This symmetrical advantage exists across each of groups A and B with respect to each other, and for the two halves of group C.

The compound scanning format of FIG. 3 is seen to have a RMIQ which is scanned by all three look directions in the roughly triangular region 70 in the center of the image field. This region is bounded by scanline B1 on the left, scanline AN on the right, and by the curved array 10 at the top. This triangular area will thus exhibit the greatest effects of spatial compounding.

FIG. 4 illustrates a second compound scanning format in accordance with the principles of the present invention. This embodiment uses look directions having a common orientation to their points of origin on the face of the array. The beams in FIG. 4 are grouped in three groups: A1 through AN including illustrated intermediate beams Ai, Aj, and Ak; B1 through BN including illustrated intermediate beams Bi, Bj, and Bk; and C1 through CN. Each scanline in the group A1 through AN has the same angle of incidence to its point of origin on the face of the array; in the illustrated example the angle is drawn to be approximately +30° to a line normal to the face of the array. Each scanline in the group B1 through BN exhibits a −30° degree angle of incidence with respect to the same reference line, and each scanline in the group C1 through CN exhibits a 0° angle of incidence to the reference line.

This second compound scanning format affords numerous advantages. One advantage is that the same beamforming time delay and weighting coefficients can be used for each beam of a given group as the beam apertures are translated across the array for different beams, given customary allowance for edge effects at the ends of the finite array. Each beam of group A is steered on transmit and reception at a +30° angle, for example. The symmetry of the groups provides an advantage even with edge effects; the coefficients and weights used for beam A1 can be mirrored and used for beam BN, for instance.

Another advantage is the wider field of view which is realized by this scanning format. This is evident from a comparison of the scanned image fields of FIGS. 3 and 4.

Another advantage is improved signal to noise performance or, stated another way, the larger useful apertures as compared with the embodiment of FIG. 3. The most acute angle of incidence in the embodiment of FIG. 4 is the most acute look direction angle, which is 30°. In the embodiment of FIG. 3 these angles are made even more acute by the arc of the curved array, as illustrated in FIG. 5a. This drawing shows three beams or scanlines emanating from array element $10_1$ at the edge of the array of FIG. 3. The three beams are steered to be parallel to the other beams of groups A, B, and C, respectively. As the drawing shows, beam A extends almost normal (12°) to the face of the element $10_1$, and will therefore be relatively effectively steered and strongly received. But beam C has an angle of incidence of 42° to the normal and beam B has an angle of incidence of 72° to the normal, and will only contribute weakly to beam steering, focusing and reception. The steeper the angle of incidence, the poorer the reception of the beam echoes or, alternatively stated, the smaller the contribution of the received echo by that element to the beamformed signal and/or the poorer the signal to noise. This is compared to the beams A, B, and C for element $10_1$ of FIG. 4, shown in FIG. 5a, where the steepest angle of incidence is 30°. Furthermore, these illustrations are only for the beam center. The angle of incidence will be even steeper at elements at one of the ends of the active transmit and receive apertures. The signal strength may be so weak or noisy at these high angles of incidence that elements will be excluded from the transmit or receive aperture, either because their contributions to beamforming are so minimal or noisy or both, thereby limiting the active aperture, particularly at shallow depths of field.

Another advantage of the embodiment of FIG. 4 which is illustrated in FIGS. 5a and 5b is grating lobe performance. The same grating lobes are drawn for beam B in each of FIGS. 5a and 5b, consisting of a main lobe 80 and side lobes 81 and 82. It is desirable that the grating lobes not extend into the image field in any significant way. As FIG. 5b shows, at an angle of 30° the grating lobes 80,81,82 do not extend into the image field in front of element $10_1$. However beam B of FIG. 5a, with its 72° angle of incidence, brings grating lobe 81 into the image field, degrading the image performance. The embodiment of FIG. 4 is thus seen to have better grating lobe performance.

Another advantage of the embodiment of FIG. 4 is the greatly enlarged RMIQ where the image field is scanned at all of the look directions. The RMIQ 90 in FIG. 4 is seen to extend from the position of beam B1 on the left to the position of beam AN on the right. As the drawing illustrates, the RMIQ is not a small triangular area as in the case of FIG. 3, but is a much larger trapezoidal, almost rectangular area. The RMIQ can be made even larger by more tightly curving the array or by the use of shallower look direction angles.

Another advantage of the embodiment of FIG. 4 is more uniform spatial sampling. As explained above, the scanline density is highest in the center of the image field of FIG. 3 and decreases as the beams and scanlines become more widely separated toward the edges of the field in the case where beam origins are uniformly spaced across the face of the array. In the embodiment of FIG. 4, uniform spacing of the beam origins results in uniform separation from scanline to scanline across each scanline group, as illustrated by the angular spacing of beams Ai,Aj,Ak, Bi,Bj,Bk, and Ci,Cj,Ck. While the beams diverge in the far field due to the radial nature of the scan, they are uniformly angularly spaced and hence provide uniform spatial sampling of the image field.

Another advantage of the embodiment of FIG. 4 is that the apertures of the beams separate uniformly as a function of depth, providing better compounding and more uniform speckle reduction over the depth of field, as illustrated by FIG. 6. This drawing shows a scanline SL from along which echoes are received from different look directions by a curved array transducer 10. Close to the transducer array at depth $D_1$ along the scanline a point is interrogated from three different look directions by beams $b_1$, $b_2$, and $b_3$. Beam $b_1$, is received from point $D_1$ by elements of an aperture $A_1$, beam $b_2$ is received from point $D_1$ by an aperture $A_2$, and beam $b_3$ is received from point $D_1$ by an aperture $A_3$. Points at greater depths along scanline SL are also interrogated by beams from multiple look directions, and the receive apertures of the beams grow (i.e., include more elements) as echoes are received from increasing depths. Thus, beam $b_4$ of larger aperture $A_4$ and beam $b_6$ of larger aperture $A_6$ interrogate deeper point $D_2$. Beam $b_2$ can also be used to interrogate point $D_2$, but echoes from this greater depth along the scanline SL will be received by a larger aperture $A_5$.

It is seen in this example that near field point $D_1$, is interrogated by beams from three relatively small apertures $A_1$, $A_2$, and $A_3$, which grow to larger sizes $A_4$, $A_5$, and $A_6$ as deeper points such as $D_2$ are interrogated. The aperture centers of the interrogating beams separate uniformly with depth as deeper points $D_n$ are interrogated, and this uniformity provides a uniformity over the image of the compounding effect and the resulting speckle reduction. This can be show mathematically starting with the expression $$C = R\left(\phi_B - \sin^{-1}\left(\frac{R\sin\phi_B}{R+r}\right)\right)$$

where C is the separation of the aperture centers along the face of the array, R is the radius of curvature of the curved array, $\phi^B$ is the beam steering angle in radians relative to its point of intersection at the face of the array, and r is the range from the array to the point on the scanline being interrogated. For relatively small beam steering angles $$C \cong R\left(\phi_B - \left(\frac{R\sin\phi_B}{R+r}\right)\right),$$

$$C \cong R\phi_B - \frac{R^2\sin\phi_B}{R+r}$$

$$C \cong R^2\phi_B + Rr\phi_B - R^2\phi_B$$

and $$C \cong Rr\phi_B$$

which shows that the aperture separation C is linearly related to depth r. This linear relationship means that more uniform speckle reduction will result from this implementation of the present invention.

A benefit which is realized by both curved array scanning embodiments is the use of the same sequence of registration coefficients for each scanline of each group, as illustrated in FIG. 7. My U.S. Pat. No. 6,135,956, entitled "ULTRASONIC DIAGNOSTIC IMAGING SYSTEM WITH SPATIAL COMPOUNDING OF RESAMPLED IMAGE DATA" describes a two stage scan conversion process for spatial compounding by which echoes from the different look directions are first registered and then compounded in estimate space, then scan converted to the desired image format in display space. An advantage of this technique is that no reprogramming of the scan converter is needed when switching between the spatial compounding mode of operation and uncompounded imaging. From the perspective of the scan converter, the incoming image data appears the same and is processed the same way. Since no reprogramming of the scan converter is needed, the user can switch between modes more rapidly. This two stage scan conversion process may be used with all of the embodiments of the present invention. FIG. 7 illustrates registration in estimate space, the first step in the two stage process, for the compound scanning technique of FIG. 4. In this illustration the scanlines of group C (C1,C2,C3, . . . CN) which are directed normal to the points of origin on the curved array have been acquired and are sampled by a digital beamformer at the circled points of equal range (time) increments. Scanlines of group A (A1,A2,A3, . . . AN) are acquired at a common angle of incidence across the image field and sampled at the same equal range increments as shown by Xs. The samples (Xs) of group A are now to be registered with the samples (Os) of group C. A preferred way to do this is four point interpolation. For example, the C2 sample 102 is within a quadrilateral area delineated by the four A samples 202, 204, 206, and 208. An A sample at the location of C sample 102 may be interpolated from the four acquired A samples by four point or up-down, right-left interpolation, by which the four A samples are combined in proportion to their proximity to the location of the C sample 102. This proportionate combining is achieved by weighting the A samples, then combining them.

Moving down the C2 scanline, an A sample is interpolated at the location 106 of the next C sample on the scanline. Sample location 106 is bounded by the four A samples at 202, 204, 214 and 216, which are used to interpolate an A sample at location 106. Because the relationship of all of the locations has changed from the location of sample 102 to that of location 106, a new set of four weighting factors is used to interpolate the A sample at location 106. This process continues down the scanline, each time using an appropriate set (location proportionate) of weighting factors for the interpolation.

However, when the registration process is done for the next scanline, the sequence of weighting factors used for the previous scanline can be reused. This is due to the recurring spatial relationships of the samples across the image field. For instance, the weights applied to A samples 208, 210, 204, and 212 to interpolate an A sample at location 108 of scanline C3 have the same values as the weights previously used to interpolate an A sample at location 102 of the previous scanline C2. The interpolation coefficients for registration are depth-dependent but not line-dependent, and hence can be the same from line to line. Thus, the same set of interpolation weights can be used for registration of each scanline, obviating the need to recalculate weighting factors for each scanline.

What is claimed is:

1. An ultrasonic diagnostic imaging system which produces spatially compounded ultrasonic images comprising:
   a curved array transducer;
   a transmitter, coupled to said curved array transducer, that drives said array transducer to produce electronically steered beams which interrogate points in an image field from multiple look directions;
   a beamformer, coupled to said curved array transducer, which forms coherent echo signals in response to said transmitted beams;
   a signal processor, coupled to said beamformer, which combines spatially registered echoes of multiple look directions to form spatially compounded image signals; and
   a display device, responsive to said compounded image signals, which displays a spatially compounded image.

2. The ultrasonic diagnostic imaging system of claim 1, wherein said array transducer transmits a first group A of beams consisting of beams A1 through AN, a second group B of beams consisting of beams B1 through Bn, and a third group C of beams consisting of beams C1 thorough CN.

3. The ultrasonic diagnostic imaging system of claim 2, wherein the beams of each group are substantially parallel.

4. The ultrasonic diagnostic imaging system of claim 3, wherein beams A1 through AN are steered at an angle of $\theta_1$ relative to a line extending normal to the face of the transducer array, beams B1 through BN are steered at an angle of $\theta_2$ relative to said line extending normal to the face of the transducer array, and beams C1 through CN are steered at an angle of $\theta_3$ relative to said line extending normal to the face of the transducer array.

5. The ultrasonic diagnostic imaging system of claim 4, wherein angle $\theta_2$ is equal to $-\theta_1$.

6. The ultrasonic diagnostic imaging system of claim 5, wherein $\theta_3$ is equal to zero degrees.

7. The ultrasonic diagnostic imaging system of claim 6, wherein said beamformer utilizes coefficients to form the coherent echo signals of a scanline, and wherein the same set of coefficient values is utilized to form the coherent echo signals of more than one scanline.

8. The ultrasonic diagnostic imaging system of claim 2, wherein said beamformer utilizes coefficients to form the coherent echo signals of a scanline, and wherein the same set of coefficient magnitude values is utilized to form the coherent echo signals of each of the scanlines of a group of scanlines formed in response to a group of beams.

9. The ultrasonic diagnostic imaging system of claim 2, wherein each of the beams of a group exhibits substantially the same angle of incidence with the face of said curved array transducer.

10. The ultrasonic diagnostic imaging system of claim 2, wherein each of the beams of a group exhibits substantially the same grating lobe performance.

11. The ultrasonic diagnostic imaging system of claim 2, wherein the beams of each group are uniformly angularly spaced.

12. The ultrasonic diagnostic imaging system of claim 2, wherein the beams of each group exhibit a predetermined steering angle with respect to their points of origin on the face of the array transducer.

13. The ultrasonic diagnostic imaging system of claim 12, wherein beams A1 through AN are each steered at an angle of $\theta_1$ relative to a line extending normal to the face of the transducer array at the origin of a beam, beams B1 through BN are steered at an angle of $\theta_2$ relative to said line extending normal to the face of the transducer array at the origin of a beam, and beams C1 through CN are steered at an angle of $\theta_3$ relative to said line extending normal to the face of the transducer array at the origin of a beam.

14. The ultrasonic diagnostic imaging system of claim 1, wherein said beamformer forms echo signals with apertures of said curved array transducer along scanlines, and wherein the centers of apertures used to interrogate points on said scanlines separate linearly as a function of depth.

15. The ultrasonic diagnostic imaging system of claim 14, wherein said apertures increase in size as a function of depth.

16. The ultrasonic diagnostic imaging system of claim 1, wherein said signal processor uses coefficients to spatially register echoes of multiple look directions, and wherein said coefficients are depth-dependent but not scanline-dependent.

17. A method of using an ultrasonic diagnostic imaging system to produce spatially compounded ultrasonic images comprising:

interrogating points in an image field from multiple look directions with beams steered from a curved array transducer, said beams being steered by a combination of the curvature of said array and electronic beam steering;

beamforming echoes received from said points from multiple look directions;

combining spatially registered echoes of multiple look directions to form spatially compounded image signals; and displaying a spatially compounded image.

18. The method of claim 17, wherein ones of said beams are steered in parallel beam paths.

19. The method of claim 17, wherein a first group of said beams are steered from different points along the face of said array transducer, and each of said beams of said first group exhibits a first angle with respect to the face of said array transducer at its respective point.

20. The method of claim 19, wherein a second group of said beams are steered from different points along the face of said array transducer, and each of said beams of said second group exhibits a second angle with respect to the face of said array transducer at its respective point.

21. The method of claim 17, further comprising beamforming the echoes of more than one scanline with the same set of coefficient magnitude values.

22. The method of claim 17, wherein groups of said beams are steered with uniform angular spacing.

23. The method of claim 17, wherein said beamforming forms echoes from multiple look directions at points along a scanline using apertures with centers which separate linearly as a function of depth.

24. The method of claim 23, wherein said apertures increase with depth.

25. The method of claim 17, further comprising registering echoes at different depths in said image field, wherein points at a common depth utilize the same registration coefficient values.

* * * * *